June 23, 1970 W. M. ANDERSON, JR 3,517,264
APPARATUS FOR PROTECTING A D.C. LOAD
Filed Dec. 30, 1966
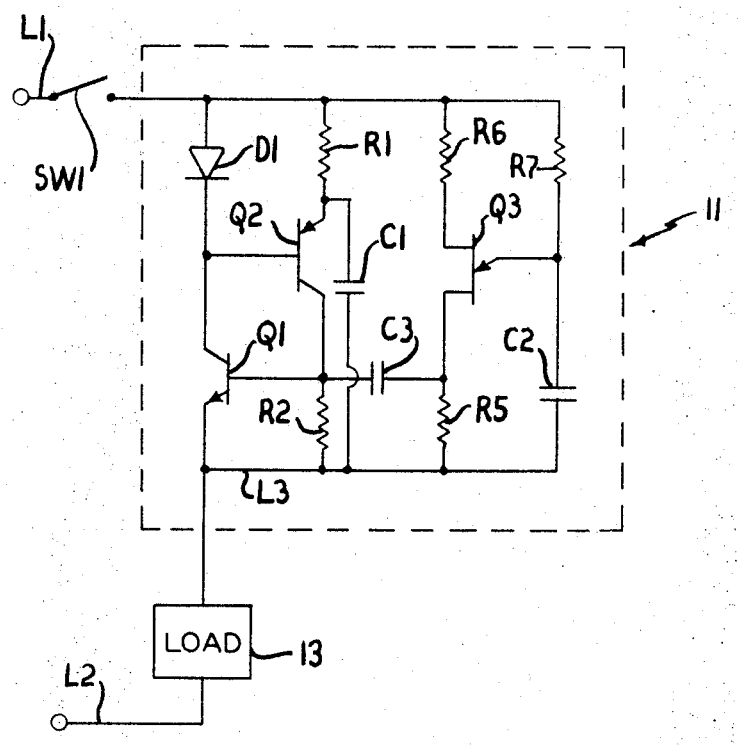
Walter M. Anderson, Jr.,
Inventor.
Koenig, Senniger, Powers and Leavitt,
Attorneys.

# United States Patent Office 3,517,264
Patented June 23, 1970

3,517,264
APPARATUS FOR PROTECTING A D.C. LOAD
Walter M. Anderson, Jr., Reading, Mass., assignor to Texas Instruments Incorporated, Dallas, Tex., a corporation of Delaware
Filed Dec. 30, 1966, Ser. No. 606,092
Int. Cl. H02h *3/08*
U.S. Cl. 317—23         11 Claims

ABSTRACT OF THE DISCLOSURE

A solid state circuit is described which automatically deenergizes a D.C. electrical load when it draws more than a preselected level of current and which then periodically tests the load and reenergizes it if the overload condition is eliminated.

BACKGROUND OF THE INVENTION

This invention relates to overload protection apparatus and more particularly to solid state apparatus for protecting a D.C. electrical load.

With various types of loads, such as transistor or other semiconductor circuitry, damage can occur in a very short period under overload conditions and it is therefore of great importance that such loads be deenergized quickly upon the occurrence of overload conditions. As various types of faults which cause overloads in such circuits are of a transitory or self-curing nature, it is also highly advantageous to have the protected load automatically reenergized if the overload condition is eliminated.

SUMMARY OF THE INVENTION

Among the several objects of the present invention may be noted the provision of apparatus for protecting a D.C. electrical load, such as a transistor circuit, from possibly damaging overload currents; the provision of such apparatus which operates very quickly to deenergize the load upon the occurrence of overload conditions; the provision of such apparatus which, after deenergizing the load upon overload conditions, then periodically tests the load and reenergizes it if the overload condition is eliminated; the provision of such apparatus which employs semiconductor components; the provision of such apparatus which is easily connected to protect a load; the provision of such apparatus which is highly reliable and which is relatively simple and inexpensive. Other objects and features will be in part apparent and in part pointed out hereinafter.

Briefly, apparatus for protecting a D.C. electrical load according to the present invention includes at least a first transistor connected in series with the load across a D.C. source. The transistor is interconnected in a circuit having a first stable state in which the transistor conducts and a second stable state in which the transistor is cut off. The apparatus also includes trigger means responsive to the presence of a substantial voltage across the transistor for periodically triggering the circuit to turn on the transistor and switch the circuit to its first stable state thereby energizing the load. A means is provided for switching the circuit to its second stable state in response to a current of greater than a preselected amplitude passing through the load thereby turning the transistor off and deenergizing the load to protect it. The source voltage then appears substantially across the transistor. With the source voltage appearing across the transistor, the load is then periodically tested by the trigger means and is reenergized if the overload condition is eliminated.

BRIEF DESCRIPTION OF THE DRAWING

The single figure illustrates a schematic circuit diagram of apparatus according to the present invention for protecting a D.C. electrical load.

DESCRIPTION OF THE PREFERRED EMBODIMENTS

Referring now to the figure there is indicated generally at 11 an overload protection circuit according to the present invention. Circuit 11, considered as an entirety, is a two-terminal device and is simply connected in series with a load 13 which is to be protected across a pair of supply leads L1 and L2 positive and negative, respectively, through which direct current is supplied for energizing the load. Lead L1 includes a switch SW1 which permits the energization of load 13 to be manually controlled.

The main portion of the load current is carried by the collector-emitter circuit of a first transistor Q1 which is of the NPN type and a silicon diode D1 which is in series with the collector lead of transistor Q1. A lead L3 is connected to the emitter terminal of transistor Q1. The voltage between leads L1 and L3 is thus substantially equal to the voltage across transistor Q1.

Transistor Q1 is connected in a regenerative circuit with a second transistor Q2 which is of the PNP type. Transistors Q1 and Q2 are thus of opposite or complementary conductivity types. The emitter terminal of transistor Q2 is connected to lead L1 through a resistor R1 and to lead L3 through a capacitor C1. The collector terminal of transistor Q2 is connected to lead L3 through a load resistor R2.

The base terminal of each of the transistors Q1 and Q2 is connected directly to the collector terminal of the other thereby providing a complementary symmetry, regenerative loop circuit. It should be noted, however, that the base-emitter input circuit of transistor Q2 is shunted by diode D1. As is understood by those skilled in the art, diode D1 has a nonlinear current-voltage characteristic and the voltage across the diode does not rise in proportion to the current drawn through it but rather rises only according to an approximately logarithmic characteristic.

A unijunction transistor Q3 is connected in a relaxation oscillator circuit across leads L1 and L3. The base-one terminal of unijunction transistor Q3 is connected to lead L3 through a resistor R5 and its base-two terminal is connected to lead L1 through a resistor R6. A timing capacitor C2 is connected between the emitter of this unijunction transistor and lead L3 and this capacitor is charged from lead L1 through a resistor R7. When a substantial voltage appears across leads L1 and L3, a succession of pulses is generated by this oscillator circuit and these pulses are coupled from the base-one terminal of unijunction transistor Q3 to the base terminal of transistor Q1 through a coupling capacitor C3.

At relatively low levels of load current, the loop gain of the regenerative circuit comprising transistors Q1 and Q2 is greater than unity and thus, as is understood by those skilled in the art, this circuit is stable under such conditions in either of two distinct states. In a first of these states, both transistors conduct to saturation, a portion of the collector current passed by each transistor being operative to forward bias and drive the other transistor. When the transistors Q1 and Q2 are thus both in their conducting or saturated states, the voltage across transistor Q1 and between leads L1 and L3 drops to a quite low value and substantially the full source voltage appears across the load 13 energizing it.

In the other or second state of the regenerative circuit, both transistors Q1 and Q2 are cut off, the voltage present at the base terminal of each transistor being insufficient to initiate conduction therein and start regenerative amplification. In this second state substantially the full source voltage appears across the collector-emitter circuit of transistor Q1 and the load 13 is deenergized.

This bistable mode of operation depends, as suggested previously, upon the loop gain of the regenerative circuit remaining greater than unity. As the base-emitter input circuit of transistor Q2 is shunted by diode D1, it will be apparent to those skilled in the art that the loop gain is affected by the current drawn through diode D1 by the load 13. At some relatively high level of current, the voltage developed across diode D1 becomes insufficient to drive enough current through the collector-emitter circuit of transistor Q2 to maintain saturation in transistor Q1. The particular current level at which this drop in loop gain occurs is determined largely by the value of the resistor R1. The voltage developed across resistor R1 rises substantially linearly with increasing load current and is effectively subtracted from the nonlinearly increasing voltage developed across diode D1 in forward biasing transistor Q2. Accordingly, at some predetermined, relatively high level of load current, the regenerative circuit breaks down and switches to its second state in which both transistors are cut off.

When a D.C. voltage is initially applied to circuit 11 and load 13 by the closing of switch SW1, circuit 11 initially assumes its aforesaid second state in which the transistors Q1 and Q2 are cut off and the load 13 is deenergized. After a preselected interval, determined by the relative values of capacitor C2 and resistor R7, a positive pulse is applied by unijunction transistor Q3 to the base terminal of transistor Q1 tending to turn this latter transistor on. Assuming that the load 13 does not initially draw an overload current through transistor Q1 and diode D1, the coupling between transistors Q1 and Q2 causes the regenerative circuit comprising these transistors to switch to its aforesaid first state in which both transistors are conducting. This switching action is augmented or speeded by the charge stored on capacitor C1 which is discharged through resistor R1 when the voltage between leads L1 and L3 drops as described previously.

When the voltage between leads L1 and L3 drops to its relatively low level, the relaxation oscillator circuit comprising unijunction transistor Q3 becomes essentially inoperative and, as long as the load 13 does not draw an overload current, the regenerative circuit comprising transistors Q1 and Q2 remains "latched" in its conducting state and substantially the full source voltage is applied to the load.

If, however, the current through load 13 exceeds the predetermined value described previously, the limited current available through resistor R1 and transistor Q2 becomes insufficient to forward bias transistor Q1 to saturation and an increasing portion of the source voltage appears across leads L1 and L3. Accordingly, a regenerative switching action is initiated and the circuit comprising transistors Q1 and Q2 reverts to its original state in which both transistors are cut off. As the voltage across leads L1 and L3 rises, capacitor C1 is charged through resistor R1 and this charging current is effectively subtracted from the current available to forward bias transistor Q1, thereby speeding the switching action. The load is thus quickly deenergized and substantially the full source voltage appears across leads L1 and L3 and the transistor Q1.

The presence of a substantial voltage across leads L1 and L3 reenergizes the unijunction transistor relaxation oscillator and thus, at predetermined intervals, triggering pulses are again applied to the base of transistor Q1. By periodically triggering the regenerative circuit, the relaxation oscillator or trigger portion of this circuit effectively tests load 13 to determine whether or not the overload condition has been eliminated. If, during one of these periodic tests, the load 13 does not draw more than the predetermined overload current, the regenerative interaction between transistors Q1 and Q2 again causes the protection circuit 11 to "latch up" and to maintain the load in energized condition as described previously with reference to the initial energization of the load.

In view of the above, it will be seen that the several objects of the invention are acheived and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. Apparatus for protecting a D.C. electrical load, said apparatus comprising:
   a transistor connected in series with said load across a D.C. source for selectively energizing said load;
   means interconnecting said transistor in a circuit having a first stable state in which said transistor is conducting and a second stable state in which said transistor is cut off;
   trigger means responsive to the presence of a substantial voltage across said transistor for periodically triggering said circuit to turn on said transistor and switch said circuit to its first stable state thereby energizing said load; and
   means responsive to current of greater than a predetermined amplitude passing through said load for switching said circuit to its second stable state thereby turning said transistor off and deenergizing said load so that the source voltage appears substantially across said transistor whereby under overload conditions said load is deenergized and then periodically tested by said trigger means and is reenergized if the overload condition is eliminated.

2. Apparatus as set forth in claim 1 wherein said circuit includes a second transistor which is of a conductivity type opposite to the conductivity type of said transistor.

3. Apparatus as set forth in claim 1 wherein said trigger means includes a unijunction transistor for periodically applying pulses to the base terminal of said transistor.

4. Apparatus as set forth in claim 1 wherein said means responsive to current of greater than a predetermined amplitude includes a device having a nonlinear current-voltage characteristic.

5. Apparatus as set forth in claim 4 wherein said device is a forward biased diode.

6. Apparatus for protecting a D.C. electrical load, said apparatus comprising:
   a pair of transistors;
   means interconnecting said transistors in a regenerative circuit having a first stable state in which at least one of said transistors is conducting and a second stable state in which said one transistor is cut off;
   means for connecting at least said one transistor in series with said load across a D.C. source for selectively energizing said load;
   trigger means responsive to the presence of a substantial voltage across said one transistor for periodically triggering said regenerative circuit to turn on said one transistor and switch said circuit to its first stable state thereby energizing said load; and
   means responsive to current of greater than a predetermined amplitude passing through said load for reducing the loop gain of said regenerative circuit for switching said circuit to its second stable state thereby turning said one transistor off and deenergizing said load so that the source voltage appears substantially across said one transistor whereby under overload conditions said load is deenergized and then periodically tested by said trigger means and is reenergized if the overload condition is eliminated.

7. Apparatus as set forth in claim 6 wherein said transistors are of opposite conductivity types and the collector of each is connected to the base of the other whereby both of said transistors conduct in said one state and both of said transistors are cut off in said second state.

8. Apparatus as set forth in claim 7 wherein said one transistor is of the NPN type and the other transistor is of the PNP type.

9. Apparatus as set forth in claim 7 wherein said means for reducing the loop gain of said regenerative circuit includes a forward biased diode connected across the basce-emitter input circuit of the other of said transistors and a resistor in series with the emitter of said other transistor.

10. Apparatus as set forth in claim 6 wherein said trigger means includes a unijunction transistor relaxation oscillator circuit.

11. Apparatus for protecting a D.C. electrical load, said apparatus comprising:
  first and second terminals adapted to be connected in series with said load across a D.C. source;
  a diode;
  a transistor;
  means for connecting the collector-emitter circuit of said transistor in series with said diode across said terminals;
  a second transistor of a conductivity type which is opposite to the conductivity type of said first transistor;
  means including a resistor for connecting the emitter of said second transistor to one of said terminals;
  means for connecting the collector of each of said transistors to the base of the other transistor for providing regenerative coupling therebetween in a circuit having two stable states; and
  a unijunction transistor relaxation oscillator connected across said terminals and responsive to a substantial voltage therebetween for periodically triggering said one transistor whereby under overload conditions said load is deenergized and then periodically tested by said trigger circuit and is reenergized if the overload condition is eliminated.

References Cited
UNITED STATES PATENTS

| | | | |
|---|---|---|---|
| 3,302,062 | 1/1967 | Craig | 317—22 |
| 3,313,985 | 4/1967 | White | 317—22 X |
| 3,336,503 | 8/1967 | White | 317—22 |
| 3,373,341 | 3/1968 | Wattson | 317—22 X |
| 3,386,005 | 5/1968 | Roland et al. | 317—22 |

JAMES D. TRAMMELL, Primary Examiner

U.S. Cl. X.R.

317—33